United States Patent [19]
Hafner et al.

[11] Patent Number: 5,925,928
[45] Date of Patent: Jul. 20, 1999

[54] DATA CARRIER CARD, ASSEMBLY OF AT LEAST TWO DATA CARRIER CARDS AND METHOD OF ACCESSING AT LEAST ONE OF THE DATA CARRIER CARDS

[75] Inventors: Karlheinz Hafner, Munich; Sönke Mehrgardt, March, both of Germany

[73] Assignee: Siemens Aktiengesellschaft, Munich, Germany

[21] Appl. No.: 08/828,697

[22] Filed: Mar. 31, 1997

Related U.S. Application Data

[63] Continuation of application No. PCT/DE95/01339, Sep. 27, 1995.

[30] Foreign Application Priority Data

Sep. 30, 1994 [DE] Germany ............... 44 35 122

[51] Int. Cl.[6] .................................................. H01L 23/02
[52] U.S. Cl. ................................. 257/679; 257/686
[58] Field of Search .................... 257/679, 686, 257/678, 685, 690, 692, 693; 235/380

[56] References Cited

U.S. PATENT DOCUMENTS

| | | | |
|---|---|---|---|
| 3,637,994 | 1/1972 | Ellingboe | 257/679 |
| 4,565,922 | 1/1986 | Anderson | 257/679 |
| 4,792,843 | 12/1988 | Haghiri-Tehrani et al. | 257/679 |
| 4,825,283 | 4/1989 | Shino | 257/679 |
| 4,841,355 | 6/1989 | Parks | 257/686 |
| 5,241,456 | 8/1993 | Marcinkiewicz et al. | 257/686 |
| 5,289,339 | 2/1994 | Akashi et al. | 361/684 |
| 5,521,433 | 5/1996 | Hirata et al. | 257/679 |
| 5,532,519 | 7/1996 | Bertin et al. | 257/686 |
| 5,541,452 | 7/1996 | Onoda et al. | 257/679 |
| 5,594,275 | 1/1997 | Kwon et al. | 257/686 |
| 5,608,265 | 3/1997 | Kitano et al. | 257/686 |

FOREIGN PATENT DOCUMENTS

| | | |
|---|---|---|
| 51455 | 3/1990 | Austria . |
| 0231090A2 | 8/1987 | European Pat. Off. . |
| 0349726A2 | 1/1990 | European Pat. Off. . |
| 0379592A2 | 8/1990 | European Pat. Off. . |
| 0546680A1 | 6/1993 | European Pat. Off. . |

*Primary Examiner*—Olik Chaudhuri
*Assistant Examiner*—Nathan K. Kelley
*Attorney, Agent, or Firm*—Herbert L. Lerner; Laurence A. Greenberg

[57] ABSTRACT

A carrier element in card form has at least one integrated semiconductor circuit disposed on the carrier element. External terminals of the data carrier card have a terminal surface disposed on an edge surface of the carrier element. Further terminal surfaces are preferably provided on main surface areas of the carrier element for an external terminal. If a plurality of data carrier cards are laid congruently one on top of the other, an electrical connection between the external terminals of the respective data carrier cards is established in a simple way.

5 Claims, 1 Drawing Sheet

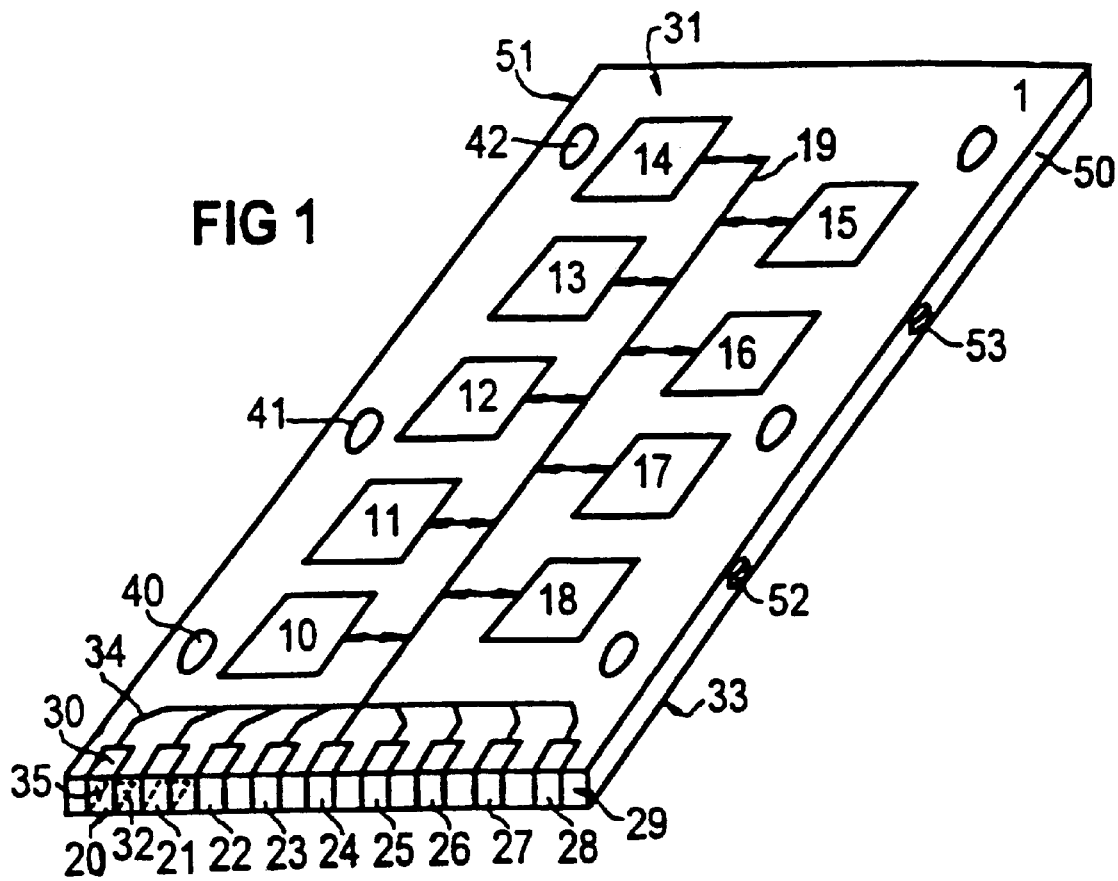
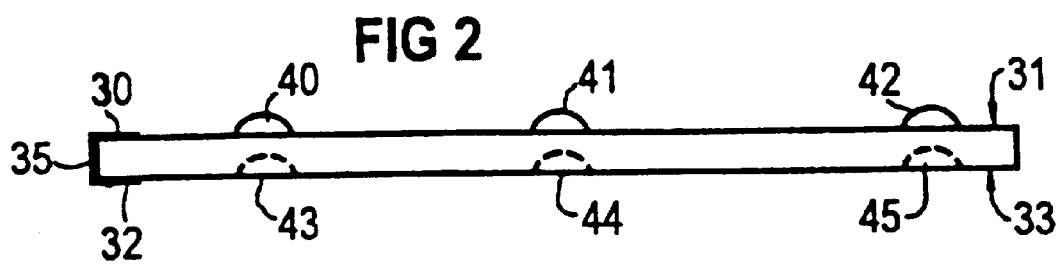

5,925,928

DATA CARRIER CARD, ASSEMBLY OF AT LEAST TWO DATA CARRIER CARDS AND METHOD OF ACCESSING AT LEAST ONE OF THE DATA CARRIER CARDS

CROSS-REFERENCE TO RELATED APPLICATION

This application is a Continuation of International Application No. PCT/DE95/01339, filed Sep. 27, 1995.

BACKGROUND OF THE INVENTION

Field of the Invention

The invention relates to a data carrier card, an assembly of at least two data carrier cards and a method of accessing at least one of the data carrier cards of the assembly.

Such data carrier cards are generally known as chip cards. A chip card has standardized dimensions and includes at least one semiconductor circuit disposed in a recess or depression of the card. The chip card has a plurality of terminals, which lie flush with a surface of a main surface area of the card within that surface and away from the edge of the card. Correspondingly complex mechanical devices are necessary in order to make contact with those terminals in a reader. Contact-making may be established by purely mechanical provisions or by using electromechanical effects.

In addition, data carrier cards for data processing devices, in particular personal computers, are known. Those data carriers which are standardized, for example, to the PCM-CIA standard, contain one or more semiconductor circuits, which are accessed by the personal computer. Such a PCM-CIA card has a terminal strip on one of its edge sides which contains pluggable contacts. The terminal strip is inserted into a corresponding terminal counterpiece in the personal computer.

The conventional data carrier cards are suitable only with reservations for the storage of considerable volumes of data. If a processing device is to access a number of PCMCIA cards, either a card change has to be carried out or else, if a plurality of cards remain inserted simultaneously, there must be a corresponding terminal socket in the processing device for each card. Those terminal devices require relatively considerable volume. That is at odds with the desire to make electronic units ever smaller. In addition, plug connections are complicated to produce and relatively expensive due to their mechanical complexity.

Published European Patent Application 0 231 090 A2, corresponding to U.S. Pat. Nos. 4,909,742 and 4,893,001, discloses an IC card which has a flexible circuit board that is surrounded by insulating plastic and has a multiplicity of electrode terminals on at least one side of the card.

In U.S. Pat. No. 5,289,339, a memory card with symmetrical terminal assignment is described. As a result, connecting of the card to a connector is possible even if the card is inserted the other way round.

Published European Patent Application 0 349 726 A2, corresponding to U.S. Pat. Nos. 5,129,091 and 5,410,714, describes an IC card with a power-saving operating state.

An IC memory card in which many memory chips are stacked on a circuit board is described in Published European Patent Application 0 379 592 A1. The memory chips in that case are interconnected by separate connection lines.

SUMMARY OF THE INVENTION

It is accordingly an object of the invention to provide a data carrier card, an assembly of at least two data carrier cards and a method of accessing at least one of the data carrier cards, which overcome the hereinafore-mentioned disadvantages of the heretofore-known devices and methods of this general type and in which the data carrier card can be connected to a processing device at the same time as a multiplicity of further similar data carrier cards without complicated additional auxiliary measures.

With the foregoing and other objects in view there is provided, in accordance with the invention, a data carrier card, comprising edge surfaces and two opposite main surface areas; at least one semiconductor circuit; and at least one external terminal connected to the at least one semiconductor circuit for electrical contact of the at least one semiconductor circuit; the at least one external terminal having a terminal surface disposed in one of the edge surfaces and at least two further terminal surfaces electrically connected to the terminal surface in one of the edge surfaces; the further terminal surfaces each lying in a respective one of the two opposite main surface areas, causing one of the further terminal surfaces of one data carrier card to come into contact with another of the further terminal surfaces of another data carrier card, when two identical data cards lie congruently on one another.

In accordance with another feature of the invention, the at least one semiconductor circuit includes a device for switching circuit parts on the at least one semiconductor circuit off with respect to an energy supply and on again after access to the data carrier card, during a rest phase.

In accordance with a further feature of the invention, one of the main surface areas has at least one projection and the opposite one of the main surface areas has a corresponding depression for receiving a projection of another data carrier card.

In accordance with an added feature of the invention, there are provided other edge surfaces directly adjoining the edge surface having the terminal surface, and at least one projection or groove on or in at least the other edge surfaces for slip-preventing interaction with a corresponding counterpiece for the projection or groove disposed on or in a housing into which the data carrier card can be inserted.

With the objects of the invention in view, there is also provided a data carrier card assembly, comprising at least two identical data carrier cards each including edge surfaces and two opposite main surface areas; at least one semiconductor circuit; and at least one external terminal connected to the at least one semiconductor circuit for electrical contact of the at least one semiconductor circuit; the at least one external terminal having a terminal surface disposed in one of the edge surfaces and at least two further terminal surfaces electrically connected to the terminal surface in one of the edge surfaces; the further terminal surfaces each lying in a respective one of the two opposite main surface areas, causing one of the further terminal surfaces of one data carrier card to come into contact with and be electrically interconnected with another of the further terminal surfaces of another data carrier card, when two of the data cards lie congruently on one another with respect to the edge surfaces.

In accordance with another feature of the invention, the at least two data carrier cards are a multiplicity of cards divided into at least two groups and including a coupling connecting the interconnected further terminal surfaces of one of the groups to the interconnected further terminal surfaces of another of the groups for electrical load isolation.

In accordance with a further feature of the invention, there is provided a fixture surrounding the cards and in which the cards are force-lockingly held, the fixture having outside dimensions coinciding with standard dimensions for inserts in processing units for accessing the cards.

In accordance with an added feature of the invention, the fixture has a connector corresponding to standard electrical parameters and spatial dimensions provided for insertion, and the connector has elements intended for electrical connection being connected to the connected further terminal surfaces of the cards.

With the objects of the invention in view, there is additionally provided a method of accessing at least one data carrier card in an assembly including at least two identical data carrier cards, which comprises sending an identification tag assigned to a card with a processing unit; receiving the tag by the electrically interconnected cards; comparing the received identification tag in the card with an identification tag stored therein; and preparing a receiver in the semiconductor circuit on the card for access if there is a match.

In accordance with a concomitant mode of the invention, there is provided a method which comprises sending the identification tag from the card to the unit when a card is removed from or inserted into the unit of the card.

Since the terminal surfaces of the data carrier card according to the invention are disposed on an edge of the card, a plurality of such cards can be laid one on top of the other without any problem. Contact between the terminals can then be established through the use of a contact bar in a corresponding terminal socket. The socket may be disposed, for example, in an access device. It is also conceivable for the terminal socket to be handled on its own and to hold the data carrier card in a mechanically fixed combination. The counterpiece may be part of a housing which corresponds in terms of its outside dimensions to standard dimensions of a standardized device insert (for example a PCMCIA card).

If, according to one embodiment, the terminal surfaces in the region of the edge are also extended to the two main surface areas of the card, contact between a plurality of cards laid one on top of the other is brought about without any further auxiliary measures. The terminal surface sections extending into the two main surface areas of the card are preferably congruent in their size.

The function assignment of the terminals is expediently symmetrical with respect to the center of the edge surface having the terminal surfaces. Consequently, the data carrier card can readily be used either way round. In addition, there is increased functional reliability, since the functional features of a terminal are duplicated.

In another configuration it is provided that the edge surface of the data carrier card and of the card receiver having the terminals has an interengaging, respectively opposing surface contour. This achieves the effect that the card can only be inserted into the card receiver, thereby forming electrical contact, at the edge surface having the terminals. If, moreover, the surface contour is not symmetrical with respect to a central card axis, it is ensured that the card cannot be inserted the wrong way round with respect to this axis of symmetry. It is only when the surface contours of the card receiver and the data carrier card mutually interengage and complement each other that the electrical contact can be established. The interengaging surface contours may, for example, include a beveled corner of the card and a correspondingly filled-in corner of the receiver and/or may include a recess of the card not disposed centrally on the card for receiving a corresponding projection of the card receiver.

The interconnected corresponding terminals of a plurality of cards lying one on top of the other act logically as a data bus. Access to the cards is monitored by a control device which is in the processing unit and is connected to the terminals. In this case, according to choice, each of the cards may be accessed individually or they may be accessed jointly. In order to be able to address a card specifically from the processing unit, the card contains a non-volatile memory in one of its semiconductor circuits with an identification tag. The identification tag may, for example, be a character allocated only for that card. It can be stored as a binary value which corresponds to a number of figures and other characters. They may include, for example, a card number and an alphanumeric text. With a corresponding coding, for example in the form of one or more check digits, access security can be achieved.

The control device in the processing unit can interrogate the identification tag of the card at regular time intervals and consequently carry out an identification cycle of all of the cards. When inserting a further card into the card receiver in the processing unit or into the receiving housing, an identification cycle may be initiated for the bus, for example by closing or opening an electrical contact or by interrupting a light barrier. In addition, all further access operations which are customary for buses are possible. For example, a data transfer between a plurality of cards directly one under the other is also possible without involving the unit-internal control device.

Preferably, each data carrier card has a device thereon by which circuit parts of the data carrier card are switched off from the energy supply. This reduces the power consumption. The device is configured in such a way that a rest phase is detected, so that thereupon one or more semiconductor circuits are deactivated. The monitoring device initially remains active. Upon receiving the identification number assigned to the card, this is detected by the device, so that thereupon the previously switched-off semiconductor circuits are again supplied with power. External addressing of the data carrier card is then possible without any delay.

According to a development of the monitoring device, it is provided that, after the elapse of a certain time period of the rest state, monitored by it, the monitoring device switches off itself and other circuit parts of the card supplied with power. The monitoring device therefore also has further circuit devices by which access to the bus is established in the first place. These devices thereupon ensure that at least the monitoring device of the card is switched on again. A received identification tag can then be evaluated, so that the remaining circuit parts disposed on the card are switched on again only if a match with the identification characteristic of the respective card has been established.

As already stated above, it is advantageous to combine a plurality of data carrier cards lying one on top of the other in a connector or in a housing. The outside terminals of the connector for further connection to the processing unit may well correspond to standardized terminals, for example of a PCMCIA card. In addition, it is advantageous if the housing corresponds in its outside dimensions to standardized dimensions for customary unit inserts, for example those of a PCMCIA card. In order to be able to place the chip cards as exactly as possible one on top of the other and consequently to ensure exact overlapping at their terminals, so that an exact electrical contact is also ensured there, positioning devices are provided on the data carrier card. These positioning devices expediently include at least one projection on the main surface area of the card, preferably in its edge region. On the opposite main surface area, the card has a corresponding depression, in which the respective projection of another card is received. Consequently, it is ensured that the cards lie exactly one on top of the other in such a way that they will not slip. With respect to a housing receiving a multiplicity of data carrier cards, corresponding positioning devices may be provided on the edge of the card and on the housing wall opposite it in each case. These may be projections or else depressions or grooves on an edge of the chip card and depressions or grooves or else projections on the opposite housing wall.

In the case of a combination of a multiplicity of data carrier cards to form a data bus, there is usually a high capacitive load on the output driver stages accessing the data bus. In the circuitry therefor, these output drivers may be realized in a conventional way, for example as open-collector stages. In order to reduce the capacitive loading, it is advantageous to divide the multiplicity of data carrier cards combined with one another to form the data bus into group segments. One segment includes a plurality of cards, for example 16 or 32, disposed directly next to one another, and having terminals that are separated from the terminals of the cards of a further segment by a buffer device. As a result, load isolation is achieved between the individual segments. Accordingly, the output drivers in one segment are subjected only to the capacitive load of the terminals of that segment. As seen logically, all of the interconnected segments act overall as a single bus.

Other features which are considered as characteristic for the invention are set forth in the appended claims.

Although the invention is illustrated and described herein as embodied in a data carrier card, an assembly of at least two data carrier cards and a method of accessing at least one of the data carrier cards, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective plan view of a data carrier card of the invention; and FIG. 2 is a longitudinal-sectional view of the card.

BRIEF DESCRIPTION OF THE DRAWINGS

Referring now to the figures of the drawings in detail and first, particularly, to FIG. 1 thereof, there is seen a data carrier card 1 that includes a substrate which is preferably formed of an electrically insulating plastic material. Disposed on the data carrier card 1 are a multiplicity of integrated semiconductor circuits 10–18. Outer surfaces of the semiconductor circuits forms a joint, substantially planar surface with a main surface area 31 of the card 1. For this purpose, the semiconductor circuits can be introduced into corresponding recesses in the card 1 by processes which are customary for chip cards, for example by an encapsulation that is known per se. The semiconductor circuits are interconnected to one another by data lines 19, which are only diagrammatically represented in FIG. 1. Terminals 20–28 are provided in order to establish an electrical contact of the card. The terminals lie on one edge of the card and they are formed of conductive metal. Each of the terminals has three interconnected terminal surfaces, namely a terminal region 35 which lies on an edge surface 29 of the card 1, a further terminal region 30 which lies on a surface of the main surface area 31 of the card 1, and a further terminal region 32 which lies on a surface of a main surface area 33 of the card 1 opposite the main surface area 31. The surface regions or sections 35, 30, 32 in each case are rectangularly constructed and in each case have a common rectangle edge with the surface 35. Each of the terminals 20–28 is connected to a line 34 and is connected through the diagrammatically represented lines 19 to one or more semiconductor circuits. The terminal surfaces 35, 30, 32 of the terminals 20–28 may terminate flush with the surface of the card 1. They may also be raised on the surface of the card 1, as is shown in the sectional representation of FIG. 2. In the illustrated embodiment, the semiconductor circuits 10–17 are memory circuits in which data are stored in a non-volatile form. These data may, for example, be digitized music signals, picture signals picked up by an electronic camera, texts (such as, for example, entire lexika), electronic maps, software for data processing installations, etc. The semiconductor memories may be memories which can be written to and erased or just read-only memories (ROMs). The data are preferably stored in compressed form with respect to their redundancy.

The semiconductor circuit 18 executes control functions. If the data are stored in compressed form, the circuit 18 carries out decompressing during reading out and, if appropriate, compressing during reading in. The semiconductor circuit or control device 18 is expediently a microprocessor. It additionally contains memory for an identification tag. The control device 18 also contains a monitoring device for power management. This device ensures that, after a predetermined time of a rest break, the memory circuits 10–17 are disconnected from the power supply. It additionally contains a time-counting device, by which the control device 18 can also be switched off once this power-saving operating mode is running. Upon arrival of any signal, the device 18 is activated again by the monitoring device, as described above. After establishing the identification characteristic assigned to the card, the remaining memory circuits 10–17 are in turn connected to the power supply.

The card 1 has semicircular projections 40, 41, 42 on a longitudinal edge of the main surface area 31. Opposite the projections 40, 41, 42, in the main surface area 33, there are depressions 43, 44, 45, into which projections of another data carrier card can engage. This makes it possible for the other card to be positioned under the data carrier card 1 in such a way that they will not slip and are in the correct location, and so that an electrical contact is established with the terminals of the other cards on the terminal region or contact area 32 of the terminals 20–28 in a simple way. In addition, the card has projections or grooves 52, 53 on edge surfaces 50, 51. When the data carrier card is pushed into a housing intended for it, the projections or grooves 52, 53 can engage in corresponding grooves or projections therein or thereon, so that the data carrier card is securely held in the housing.

We claim:

1. A data carrier card assembly, comprising:
    at least two identical data carrier cards each including:
        edge surfaces and two opposite main surface areas;
        at least one semiconductor circuit; and
        at least one external terminal connected to said at least one semiconductor circuit for electrical contact of said at least one semiconductor circuit;
        said at least one external terminal having a terminal surface disposed in one of said edge surfaces and at least two further terminal surfaces electrically connected to said terminal surface in one of said edge surfaces;

said further terminal surfaces each lying in a respective one of said two opposite main surface areas, causing one of said further terminal surfaces of one data carrier card to come into contact with and be electrically interconnected with another of said further terminal surfaces of another data carrier card, when two of said data cards lie congruently on one another with respect to said edge surfaces; and said at least two data carrier cards are a multiplicity of cards divided into at least two groups, and including a coupling connecting said interconnected further terminal surfaces of one of said groups to said interconnected further terminal surfaces of another of said groups for electrical load isolation.

2. The assembly according to claim 1, including a fixture surrounding said cards and in which said cards are forcelockingly held, said fixture having outside dimensions coinciding with standard dimensions for inserts in processing units for accessing said cards.

3. The assembly according to claim 2, wherein said fixture has a connector corresponding to standard electrical parameters and spatial dimensions provided for insertion, and said connector has elements intended for electrical connection being connected to said connected further terminal surfaces of said cards.

4. A method of accessing at least one data carrier card in an assembly including at least two identical data carrier cards each having edge surfaces and two opposite main surface areas; at least one semiconductor circuit; and at least one external terminal connected to the at least one semiconductor circuit for electrical contact of the at least one semiconductor circuit; the at least one external terminal having a terminal surface disposed in one of the edge surfaces and at least two further terminal surfaces electrically connected to the terminal surface in one of the edge surfaces; the further terminal surfaces each lying in a respective one of the two opposite main surface areas, causing one of the further terminal surfaces of one data carrier card to come into contact with and be electrically interconnected with another of the further terminal surfaces of another data carrier card, when two of the data cards lie congruently on one another with respect to the edge surfaces, the method which comprises:

sending an identification tag assigned to a card with a processing unit;

receiving the tag by the electrically interconnected cards;

comparing the received identification tag in the card with an identification tag stored therein; and preparing a receiver in the semiconductor circuit on the card for access if there is a match.

5. The method according to claim 4, which comprises sending the identification tag from the card to the unit when a card is removed from or inserted into the unit of the card.

* * * * *